United States Patent [19]
Matsumoto et al.

[11] Patent Number: 5,477,035
[45] Date of Patent: Dec. 19, 1995

[54] HIGH FREQUENCY INDUCTION AND METHOD WITH TEMPERATURE CONTROL

[75] Inventors: Isao Matsumoto, Hatano; Tetsuo Fusato, Zama; Fumitoshi Kimura, Kanagawa; Fujio Matsui, Tokyo, all of Japan

[73] Assignees: Denki Kogyo Company, Ltd.; Fuji Jukogyo Kabushiki Kaisha, both of Tokyo, Japan

[21] Appl. No.: 225,154

[22] Filed: Apr. 8, 1994

[30] Foreign Application Priority Data

Apr. 9, 1993 [JP] Japan .................. 5-082954

[51] Int. Cl.⁶ .................. H05B 6/10; H05B 6/06
[52] U.S. Cl. .................. 219/635; 219/667; 219/663; 60/286
[58] Field of Search .................. 219/666, 667, 219/665, 635, 663; 60/272, 286, 303

[56] References Cited

U.S. PATENT DOCUMENTS

| | | | |
|---|---|---|---|
| 2,945,112 | 7/1960 | Scott | 219/666 |
| 3,581,489 | 6/1971 | Camin et al. | 60/30 |
| 3,761,667 | 9/1973 | Walden | 219/663 |
| 3,985,947 | 10/1976 | Keller | 219/666 |
| 4,280,038 | 7/1981 | Havas et al. | 219/666 |
| 4,392,040 | 7/1983 | Rand et al. | 219/662 |
| 4,578,552 | 3/1986 | Mortimer | 219/663 |
| 5,126,522 | 6/1992 | Katayama et al. | 219/663 |

FOREIGN PATENT DOCUMENTS

WO-A-8202593  5/1982  WIPO.

Primary Examiner—Philip H. Leung
Attorney, Agent, or Firm—Arnold, White & Durkee

[57] ABSTRACT

A resonance circuit including a high frequency induction heating coil is set to a resonance state and a heating temperature of an object to be heated (for example, catalytic converter or the like) is controlled on the basis of a resonance frequency varied with an increased temperature of the object under the resonance state.

3 Claims, 6 Drawing Sheets

HIGH FREQUENCY INDUCTION AND METHOD WITH TEMPERATURE CONTROL

FIELD OF THE INVENTION AND RELATED ART STATEMENT

The present invention relates to a heating temperature control method in high frequency induction heating and a high frequency induction heating temperature control apparatus, and more particularly to a control method and apparatus suitable for accurately controlling a heating temperature of an object to be heated when a high frequency induction heating coil is used to high frequency induction heat the object.

A catalytic converter disposed on the way of an exhaust pipe of an automobile to purify exhaust gas is heated by the exhaust gas to a high temperature during traveling of the automobile and accordingly the purification of the exhaust gas by the catalytic converter is performed effectively, while the catalytic converter is at the normal temperature upon starting of an engine of the automobile and accordingly the purification is not performed effectively. Accordingly, in order to perform the purification of exhaust gas upon starting of the engine sufficiently, it is necessary to heat the catalytic converter forcedly upon starting of the engine.

Thus, in a conventional heating method of the catalytic converter, a DC current flows in the catalytic converter directly to utilize the Joule heat. FIG. 12 illustrates a conventional high frequency induction heating temperature control apparatus 50 for carrying out the conventional heating method. The apparatus 50 serves to heat a catalytic converter (object to be heated) 51 to a previously set temperature.

The conventional high frequency induction heating temperature control apparatus 50 is configured to supply electric power from a DC power supply 52 to the catalytic converter 51 constituting the object to be heated and Joule-heat it and to detect a heating temperature of the catalytic converter 51 by means of a thermocouple temperature sensor 53 attached to the catalytic converter 51. The thermocouple temperature sensor 53 produces a voltage signal proportional to a detected temperature to supply it to a comparator 54, which compares the voltage signal with a predetermined reference voltage.

When the temperature detected by the thermocouple temperature sensor 53 exceeds a predetermined reference voltage, the comparator 54 produces a predetermined control signal. The control signal switches a power switch 55 from an on state to an off state to cut off supply of electric power to the catalytic converter 51, so that heating of the catalytic converter 51 is stopped.

With such a circuit operation, the catalytic converter 51 is heated to the predetermined set temperature and is controlled not to exceed the set temperature.

In the conventional high frequency induction heating temperature control method and the high frequency induction heating temperature control apparatus 50 as described above, however, since the catalytic converter 51 is heated by directly flowing a current therein, a large-capacity DC power supply and extremely heavy lead wires are required in order to heat the converter in a relatively short time, and accordingly it is not suitable for an automobile.

Further, since the thermocouple temperature sensor 53 is used as detection means of the heating temperature of the catalytic converter 51 and the thermocouple temperature sensor 53 is brought into contact with the catalytic converter 51 to detect the temperature thereof, there are defects as follows. During traveling of the automobile (during continuous operation of an engine), the catalytic converter 51 is heated to a high temperature by exhaust gas heated at a high temperature and the thermocouple temperature sensor 53 is also heated to a high temperature correspondingly. Accordingly, the thermocouple temperature sensor 53 tends to be deteriorated in its early stage. Hence, the durability of the thermocouple temperature sensor 53 comes into question and there is a possibility that an accurate temperature can not be detected. In addition, mechanical vibration is transmitted to the thermocouple temperature sensor 53 through the catalytic converter 51 easily, so that the thermocouple temperature sensor 53 is separated from the catalytic converter 51 due to large mechanical vibration and there is a possibility that the thermocouple temperature sensor can not attain the temperature detection function.

Further, it is considered that a heating time is set to a predetermined time by a timer and high frequency induction heating is performed for the predetermined time without using the thermocouple temperature sensor 53, while in this case the heating time is scattered due to variation in dimension and quality of material of the object to be heated and deterioration in aging of the quality of material, so that high frequency induction heating with high accuracy can not be attained.

OBJECT AND SUMMARY OF THE INVENTION

The present invention has been made in order to solve the above problems and an object of the present invention is to provide a heating temperature control method in high frequency induction heating and a high frequency induction heating temperature control apparatus capable of detecting a temperature of an object to be heated accurately in the non-contact manner without using a contact type thermocouple temperature sensor to high frequency induction heat the object to a desired temperature and having excellent durability.

In order to achieve the above object, in the control method according to the present invention, a resonance circuit having a high frequency induction heating coil is set to a resonance state and a heating temperature of an object to be heated is controlled on the basis of a resonance frequency varying with increased temperature of the object in the resonance state.

Further, in the control method according to the present invention, a high frequency induction heating means has an inverter for changing a direct current into an alternating current with a high frequency and a coil connected to said inverter for generating a heat by an induction of said high frequency, comprising the steps of:

deciding an inductance by resonating said high frequency;

deriving a relative permeability in proportion to said inductance of said coil;

calculating a corresponding to said relative permeability in accordance with a data stored in a memory; and controlling said temperature responsive to a change of said high frequency so as to accurately heat said coil at a high speed.

The object to be heated is a catalytic converter for purifying exhaust gas of an automobile in the above heating temperature control method.

The control apparatus according to the present invention comprises:

(a) high frequency power supply unit;

(b) a resonance circuit including a series circuit of a high frequency induction heating coil for high frequency induction heating an object to be heated and a condenser to be supplied with high frequency electric power from the high frequency power supply unit;

(c) a phase control circuit for controlling a power supply frequency of the high frequency power supply unit so that a phase of a high frequency voltage produced by the high frequency power supply unit is substantially coincident with a phase of a high frequency current flowing through the high frequency induction heating coil to always set the resonance circuit to a resonance state; and (d) a flag signal generating circuit for detecting that the power supply frequency of the high frequency power supply unit reaches a predetermined frequency to generate a predetermined flag signal;

whereby the object is high frequency induction heated continuously while the resonance circuit is always set to the resonance state by the control circuit in response to variation of an impedance of the high frequency induction heating coil due to increased temperature of the object to be heated and supply of electric power to the resonance circuit from the high frequency power supply is cut off on the basis of the flag signal generated by the flag signal generating circuit when a resonance frequency of the resonance circuit reaches a predetermined frequency.

Operation of the present invention is as follows. That is, the resonance frequency in the case where the resonance circuit including the high frequency induction heating coil is set to the resonance state is varied with the increased temperature of the object to be heated. Accordingly, variation of the temperature of the object to be heated is previously obtained for a parameter of the resonance frequency in the case where the resonance circuit is always set to the resonance state, so that a heating temperature of the object to be heated can be detected on the basis of the resonance frequency and heating of the object can be stopped in response to the detection to control the heating temperature.

DETAILED DESCRIPTION OF PREFERRED EMBODIMENTS

Embodiment of the present invention are now described in detail with reference to FIGS. 1 to 11.

Figure 1:
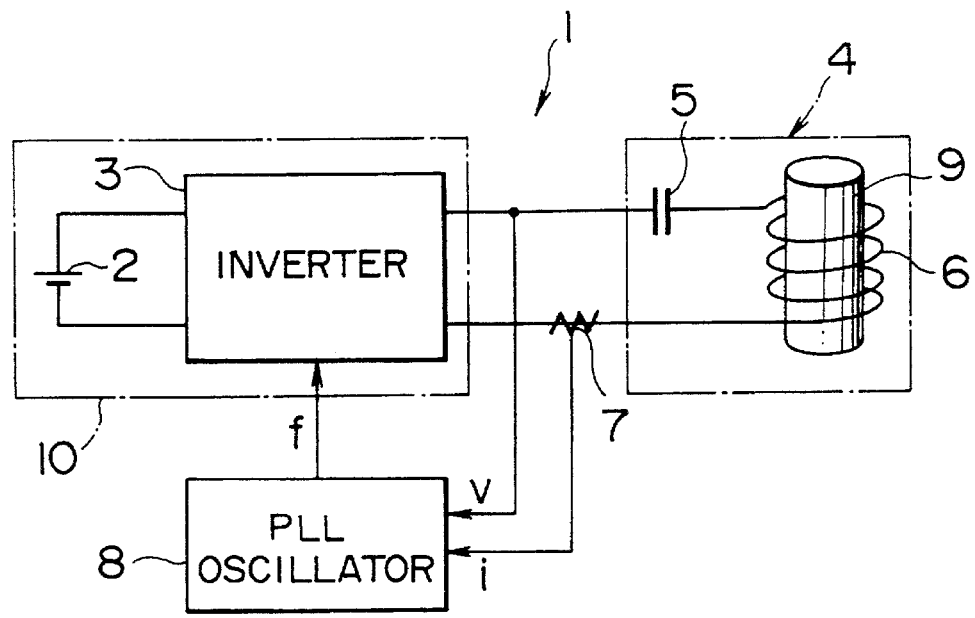
FIG. 1 is a circuit diagram of a portion of a high frequency induction heating temperature control apparatus used to implement a heating temperature control method according to the present invention.

FIG. 1 schematically illustrates a portion of a high frequency induction heating temperature control apparatus 1 used to implement a heating temperature control method in a high frequency induction heating according to the present invention. In FIG. 1, numeral 2 denotes a DC power supply, 3 an inverter for converting electric power supplied from the DC power supply 2 into high frequency electric power, 4 a resonance circuit constituted by a series circuit of a resonance condenser 5 and a high frequency induction heating coil 6 supplied with the high frequency electric power from the inverter 3, 7 a current transformer (CT) for detecting a high frequency current flowing through the high frequency induction heating coil 6, and 8 a PLL oscillation circuit supplied with a current flowing through the current transformer 7 and an output voltage of the inverter 3.

Figure 2:
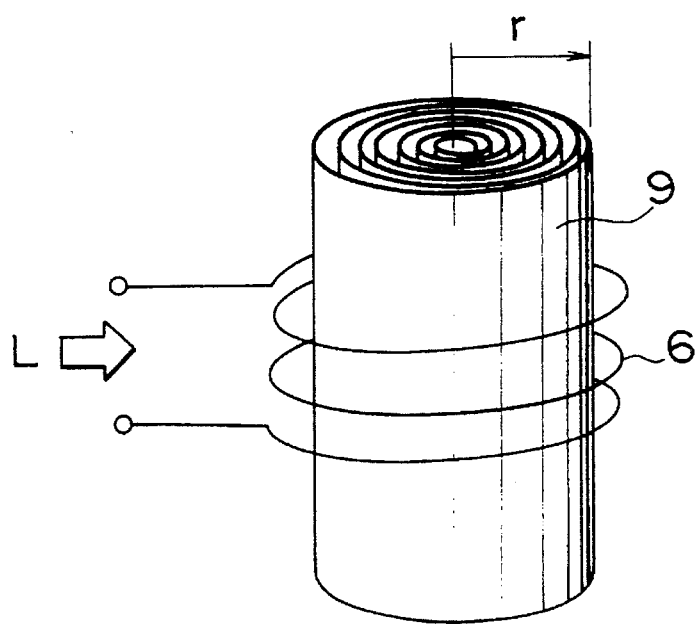
FIG. 2 is a perspective view illustrating a catalytic converter which is an object to be heated and is disposed in a high frequency induction heating coil.

Further, in FIG. 1, numeral 9 denotes an object to be high frequency induction heated by the high frequency induction heating coil 6, and the object to be heated of the embodiment is a catalytic converter for purifying exhaust gas used in an exhaust pipe of an automobile. As shown in FIG. 2, the catalytic converter 9 includes a sheet of steel plate wound spirally and having a catalytic layer of platinum or the like formed on the surface thereof. The high frequency induction hating coil 6 is disposed about the catalytic converter 9 concentrically.

In the apparatus 1, the inverter 3 is controlled to be operated on the basis of a frequency f of a control signal produced by the PLL oscillation circuit 8 and the inverter 3 produces high frequency electric power having the same frequency as the frequency f so that the resonance circuit 4 is always set to the resonance state.

When an impedance Zr of the high frequency induction heating coil 6 is expressed as described by the following equation (a), an impedance Zo as viewed from the power supply side is expressed as described by the following equation (b) since the resonance condenser C and the high frequency induction heating coil 6 constitute a series circuit.

$$Zr = r + j \cdot 2\pi f \cdot L \tag{a}$$

where r is a pure resistance component of the coil 6 when the catalytic converter 9 is inserted into the high frequency induction heating coil 6, L is an inductance of the coil 6, and f is a frequency.

$$\begin{aligned} Zo &= (r + j \times 2\pi f \times L) - j \times \frac{1}{2\pi fC} \\ &= r + j \times \left( 2\pi fL - \frac{1}{2\pi fC} \right) \\ &= |Zo| \times \epsilon^{j\theta} \end{aligned} \tag{b}$$

-continued where $$\theta = \tan^{-1} \frac{2\pi fL - \frac{1}{2\pi fC}}{r} \quad (c)$$

When the resonance circuit 4 constituted by the series circuit of the resonance condenser C and the high frequency induction heating coil 6 is controlled to be in the resonance state, θ of the above equation (c) is 0 degree (θ=0°). The resonance frequency at this time is as described by the following equation (d).

$$f_o = \frac{1}{2\pi \sqrt{LC}} \quad (d)$$
$$\propto k_1 \times \frac{1}{\sqrt{L}}$$

where $k_1$ is a constant.

Figure 3:
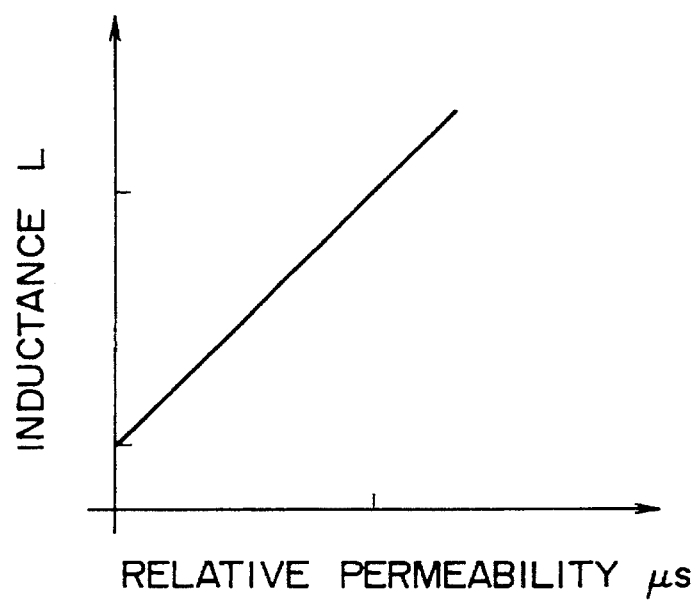
FIG. 3 is a graph showing a relation of an inductance L and a relative permeability $\mu_s$ of the high frequency induction heating coil.

On the other hand, a relation of the inductance L and the relative permeability $\mu_s$ of the high frequency induction heating coil 6 as viewed from the power supply side in the state where the catalytic converter 9 is inserted into the high frequency induction heating coil 6 is in proportional relation as shown in FIG. 3 and is expressed by the following equation (e).

$$L \propto k_2 \cdot \mu_s \quad (e)$$

where $k_2$ is a constant and $\mu_s$ is the relative permeability.

Figure 4:
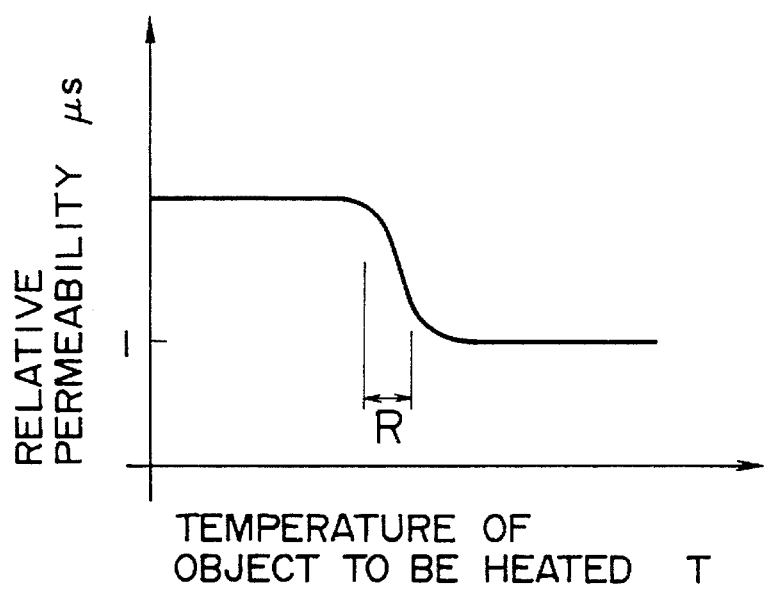
FIG. 4 is a graph showing a relation of a temperature T and a relative permeability $\mu_s$ of the object to be heated.
Figure 5:
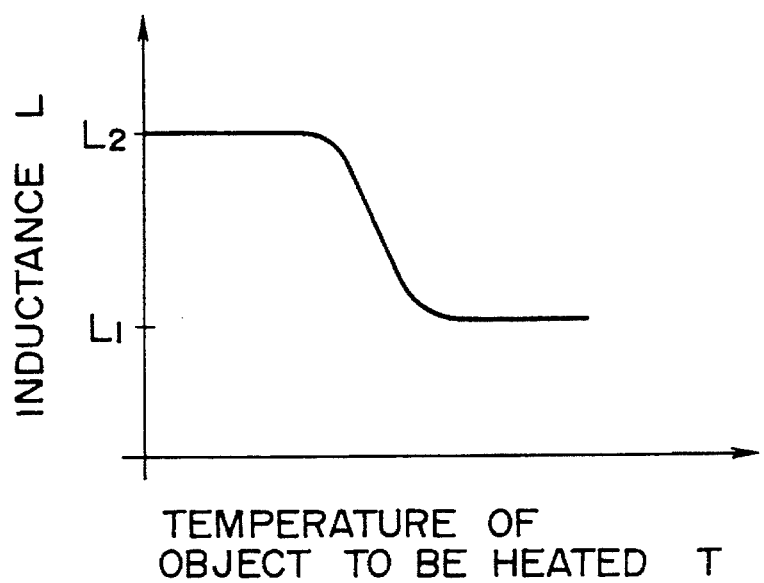
FIG. 5 is a graph showing a relation of a temperature T of the object to be heated and an inductance L of the high frequency induction heating coil.

Further, a relation of the relative permeability $\mu_s$ and a temperature T of the object to be heated is in correlative relation as shown in FIG. 4 and has a linear function in its specific area R as shown in the following equation (f). A relation of the temperature T of the object and the inductance L of the high frequency induction heating coil 6 is as shown in FIG. 5.

$$\mu_s = F(T) \quad (f)$$

Figure 6:
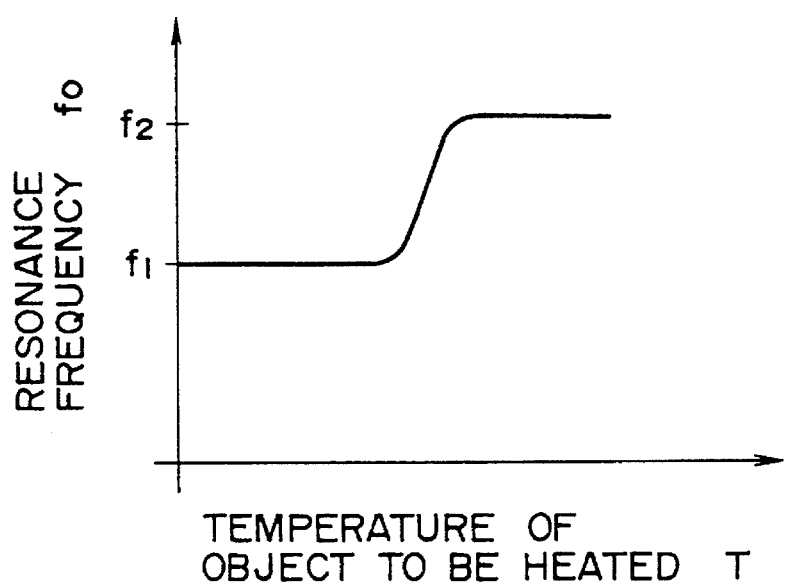
FIG. 6 is a graph showing a relation of a temperature T of the object to be heated and a resonance frequency $f_o$.

Thus, when a relation of the temperature T of the object and the resonance frequency $f_o$ is obtained from the above equations (d), (e) and (f), the following equation (g) is obtained. The relation thereof is as shown in FIG. 6.

$$f_o = k_1 \times \frac{1}{\sqrt{L}} = k_1 \times \frac{1}{\sqrt{k_2 \times \mu_s}} = k_1 \times \frac{1}{\sqrt{k_2 \times F(T)}} \quad (g)$$
$$= K \times \frac{1}{\sqrt{F(T)}}$$

where K is a constant.

Accordingly, it will be understood from the equation (g) that the temperature T and the resonance frequency $f_o$ have one-to-one correspondence to each other in the specific range. Accordingly, it can be understood that the temperature T of the object to be heated (catalytic converter 9) can be detected on the basis of the resonance frequency $f_o$.

Thus, in the apparatus 1 of FIG. 1, as high frequency electric power is supplied to the resonance circuit 4 from the high frequency power supply unit 10 including the DC power supply 2 and the inverter 3, a high frequency current flows through the high frequency induction heating coil 6 to thereby induction heat the catalytic converter 9. At this time, an output voltage v of the high frequency power supply unit 10 is supplied to the PLL oscillation circuit 8 and a high frequency current i flowing through the high frequency induction heating coil 6 is also supplied to the PLL oscillation circuit 8 through the current transformer 7, so that a control signal having a frequency f in accordance with the high frequency voltage v and the high frequency current i supplied to the PLL oscillation circuit 8 is supplied to the inverter 3 from the PLL oscillation circuit 8. Consequently, high frequency electric power having the same frequency f as that of the control signal is supplied to the resonance circuit 4 from the high frequency power supply unit 10 so that the resonance circuit 4 is controlled to be always in the resonance state.

More particularly, as the catalytic converter 9 is induction heated and its temperature is increased, the relative permeability $\mu_s$ is varied. Thus, the resonance circuit 4 is set to the resonance state always by means of operation of the PLL oscillation circuit 8 so as to follow the variation of the relative permeability. In this manner, when the resonance frequency is gradually changed and reaches a predetermined frequency, supply of electric power from the high frequency power supply unit 10 is stopped.

In this case, a relation of the resonance frequency $f_o$ of the resonance circuit 4 and the heating temperature T of the catalytic converter 9 is previously obtained. When the resonance frequency corresponding to a desired heating temperature is reached, supply of electric power can be stopped to thereby set the heating temperature of the catalytic converter 9 to a desired temperature.

Figure 7:
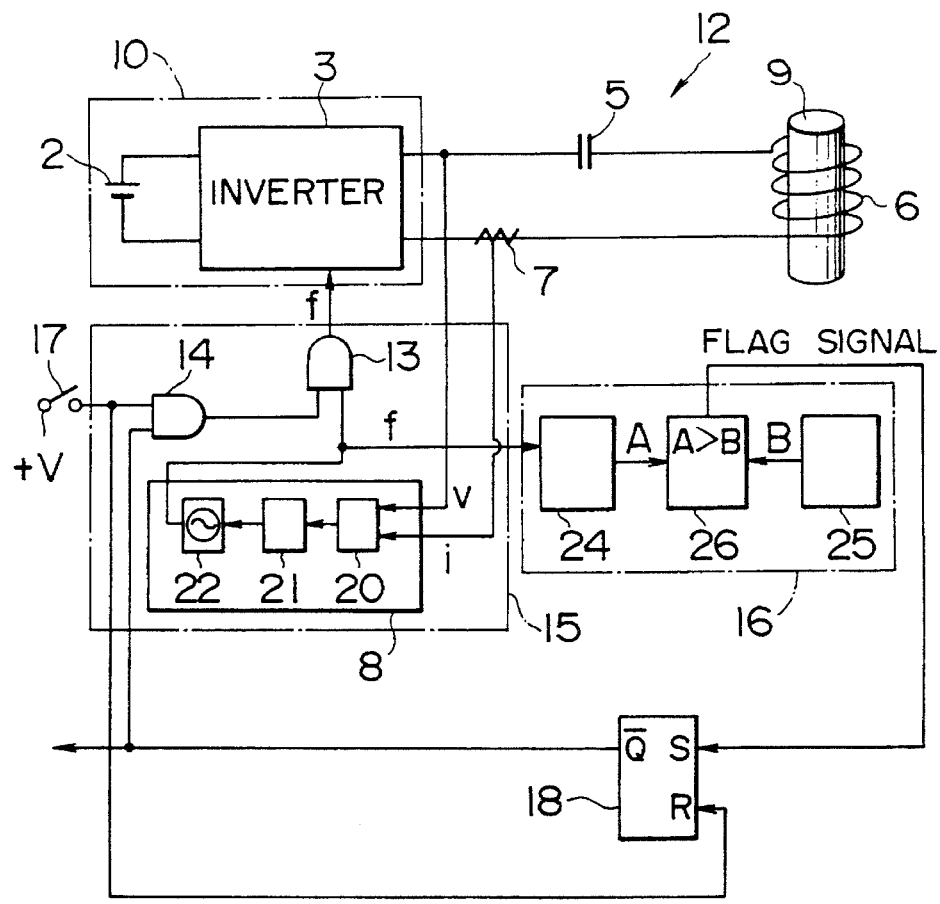
FIG. 7 is a circuit diagram showing an actual example of a high frequency induction heating temperature control apparatus according to the present invention.

FIG. 7 schematically illustrates a definite example using the circuit of FIG. 1, that is, a high frequency induction heating control apparatus 12 according to the present invention. In FIG. 7, like numerals to those of FIG. 1 are designated by like numerals and its detailed description is omitted.

As illustrated in FIG. 7, the apparatus 12 of this example includes the high frequency power supply unit 10 composed of the DC power supply 2 and the inverter 3, the resonance circuit 4 composed of the resonance condenser 5 and the high frequency induction heating coil 6, a phase control circuit 15 composed of the PLL oscillation circuit 8 and first and second gate circuits 13 and 14, a flag signal generating circuit 16 for generating a predetermined flag signal on the basis of an output frequency of the PLL oscillation circuit 8, and a flip-flop 18 for producing a change-over signal for changing over a change-over switch 17 for stopping of the heating from an on state to an off state on the basis of the flag signal.

The PLL oscillation circuit 8 includes a phase comparator 20 for comparing a phase of the high frequency voltage v from the inverter 3 with a phase of the high frequency current i from the current transformer 7, a low pass filter 21 through which an output of the phase comparator 20 passes, and a voltage controlled oscillator 22 which is operated on the basis of a control voltage from the low pass filter 21.

On the other hand, the flag signal generating circuit 16 includes a frequency counter 24 supplied with an output of the voltage controlled oscillator 22 of the PLL oscillation circuit 8, a frequency setting device 25 capable of setting a desired frequency, and a frequency comparator 26 for comparing an output of the frequency counter 24 with an output of the frequency setting device 25 to supply the flag signal to the flip-flop 18 when a predetermined condition is satisfied.

Further, the output of the voltage controlled oscillator 22 of the PLL oscillation circuit 8 is supplied to the first gate circuit 13. The second gate circuit 14 is supplied with an output signal of the flip-flop 18 and is also supplied with a predetermined input voltage +V through the change-over switch 17. Thus, an output signal from the second gate circuit 14 is supplied to the first gate circuit 13 and an output signal of the first gate circuit 13 is supplied to the inverter 3 as the frequency control signal.

Operation of the high frequency induction heating temperature control apparatus 12 thus configured is now described.

First of all, in the beginning of heating, the change-over switch is turned on and the output frequency of the PLL oscillation circuit 8 is supplied through the first gate circuit 13 to the inverter 3.

In this state, when the DC voltage is supplied to the inverter 3 from the DC power supply 2, the DC voltage is converted into the high frequency voltage by the inverter 3. In this case, the inverter 3 is driven by the control signal supplied from the first gate circuit 13 and the inverter 3 produces the high frequency voltage v having the same frequency f as that of the control signal.

Figure 8:
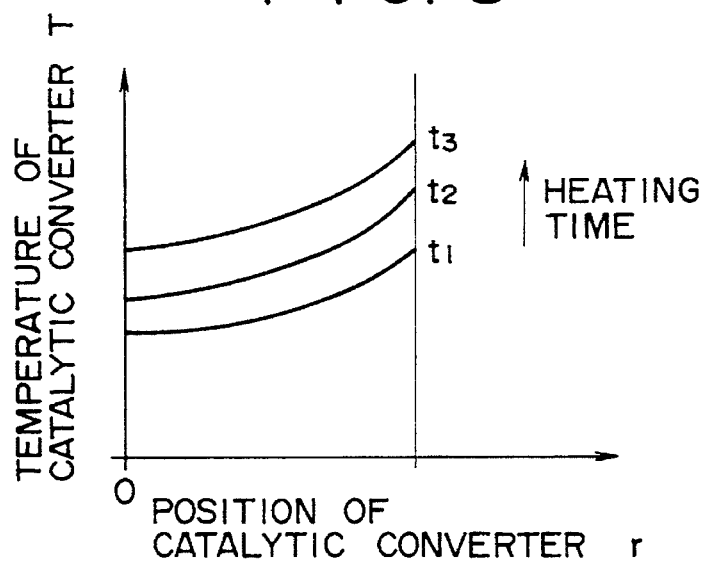
FIG. 8 is a graph showing temperature T in a position r of a catalytic converter which is an object to be heated.
Figure 9:
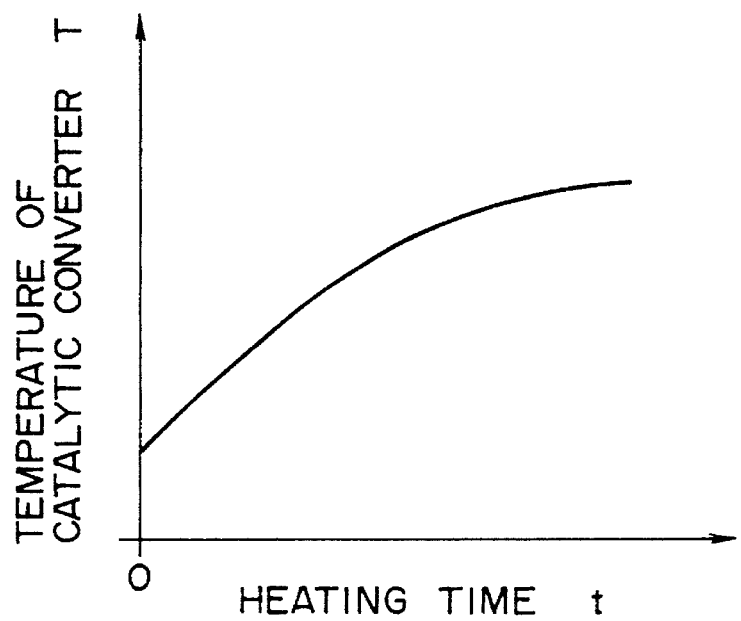
FIG. 9 is a graph showing a relation of a heating time t and a temperature T of the catalytic converter.

The high frequency voltage v is supplied to the resonance circuit 4, so that the high frequency current flows into the high frequency induction heating coil 6 to thereby induction-heat the catalytic converter 9 (object to be heated) inserted into the high frequency induction heating coil 6 so that temperature of the catalytic converter is increased. In this case, the catalytic converter 9 is gradually heated from its outer periphery as shown in FIG. 8 and the temperature T of the catalytic converter 9 is varied with the elapse of the heating time t as shown in FIG. 9.

During the above induction heating, the high frequency current flowing through the high frequency induction heating coil 6 is supplied to the phase comparator 20 through the current transformer 7. The phase comparator 20 compares the phase of the high frequency current i from the current transformer 7 with the phase of the output voltage v from the inverter 3 to produce the voltage signal proportional to a phase difference between the high frequency current i and the output voltage v. An output voltage of the phase comparator 20 is supplied to the low pass filter 21 in which harmonics of the output voltage are removed to be converted into a DC voltage. The DC voltage is supplied to the voltage controlled oscillator 22.

Thus, the PLL oscillation circuit 8 is operated so that the frequency f of the oscillation output of the voltage controlled oscillator 22 is made high when the phase of the high frequency current i is advanced ($\theta<0°$) as compared with the phase of the output voltage v and on the contrary the frequency f is made low when the phase of the high frequency current i is delayed ($\theta>0°$) as compared with the phase of the output voltage v.

On the other hand, in the oscillation circuit 4 including the series circuit of the resonance condenser 5 and the high frequency induction heating 6, when the frequency of the power supply voltage supplied from the inverter 3 (that is, the oscillation frequency f of the voltage controlled oscillator 22) is made high, the phase of the high frequency current i is delayed as compared with the phase of the output voltage v and on the contrary when the frequency f of the power supply voltage is made low, the phase of the high frequency current i is advanced as compared with the phase of the output voltage v. Thus, when the resonance condenser 5 and the high frequency induction heating coil 6 are resonated so that the resonance circuit 4 is in the resonance state, the PLL oscillation circuit is operated to minimize the phase difference of the output voltage v and the high frequency current i ($\theta=0°$).

Accordingly, the output voltage of the phase comparator 20 in the PLL oscillation circuit 8 is in the negative feedback state with respect to the oscillation frequency f of the voltage controlled oscillator 22 and finally the phase difference $\theta$ of the output voltage v and the high frequency current i automatically controlled to be equal to 0°, that is, the resonance circuit 4 is automatically controlled to be in the resonance state.

Figure 10:
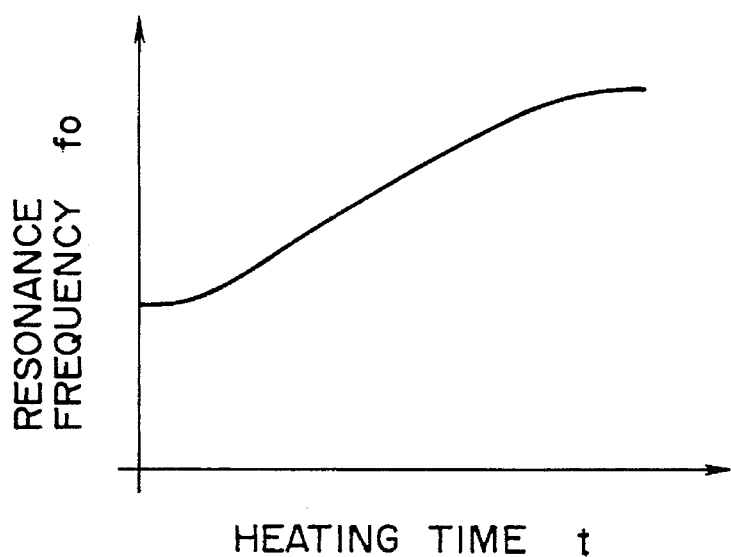
FIG. 10 is a graph showing a relation of a heating time t and a resonance frequency $f_o$.

The relative permeability $\mu_s$ is varied with increase of the heating temperature of the catalytic converter 9 as described above to thereby shift the resonance frequency $f_o$, while the resonance state is always set automatically by means of the phase lock operation by the PLL oscillation circuit 8 and the following operation to the resonance state is automatically performed for a parameter of the oscillation frequency f. Thus, the resonance frequency $f_o$ is varied with the elapse of the heating time t as shown in FIG. 10.

On the other hand, the output frequency of the voltage controlled oscillator 22 is supplied to the frequency counter 24 so that the oscillation frequency f is converted into a digital signal by the frequency counter 24. The digital signal is supplied to the frequency comparator 26 to be compared with a set value of the frequency setting device 25. The setting operation of the set value is made so that a relation of the resonance frequency and the heating temperature in the catalytic converter 9 to be heated is previously obtained and the output frequency of the voltage controlled oscillator is set to be equal to the numerical value of the resonance frequency corresponding to a desired heating temperature.

When the frequency of the frequency counter 24 exceeds the frequency of the frequency setting device 25, the flag signal is generated by the frequency comparator 26 and is supplied to the flip-flop 18 to be held in the flip-flop. The flip-flop 19 produces a predetermined heating stop signal in response to the flag signal to be supplied to a controller not shown. Thus, the heating stop signal is supplied to the second gate circuit 14 and the change-over switch 17 is changed over from the on state to the off state in accordance with the heating stop signal to thereby cut off supply of the electric power +V to the second gate circuit 14. Consequently, the frequency output of the PLL circuit 8 is cut off by the first gate circuit 13 and is not supplied to the inverter 3.

As a result, supply of the high frequency voltage to the resonance circuit 4 is cut off and the induction heating is stopped just after the temperature of the catalytic converter 9 has reached the desired set temperature.

Figure 11:
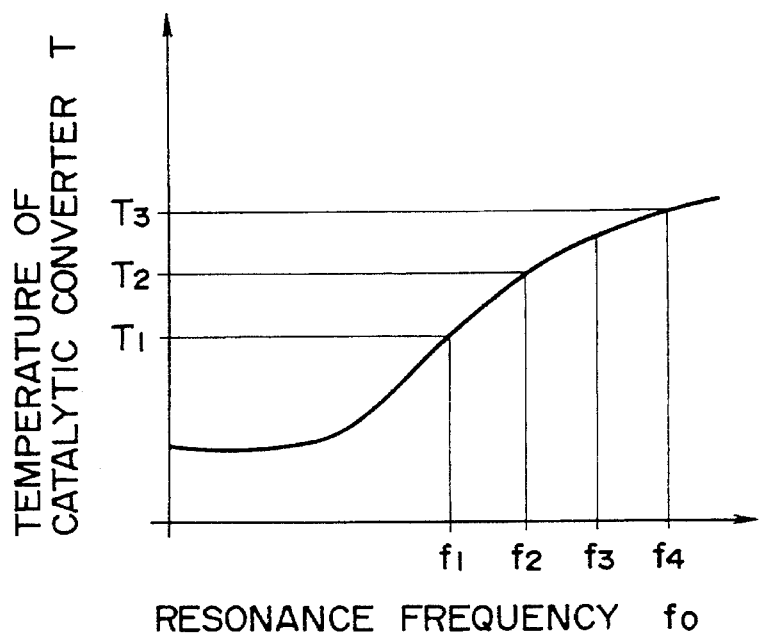
FIG. 11 is a graph showing a relation of a heating time t and a temperature T of the catalytic converter.
Figure 12:
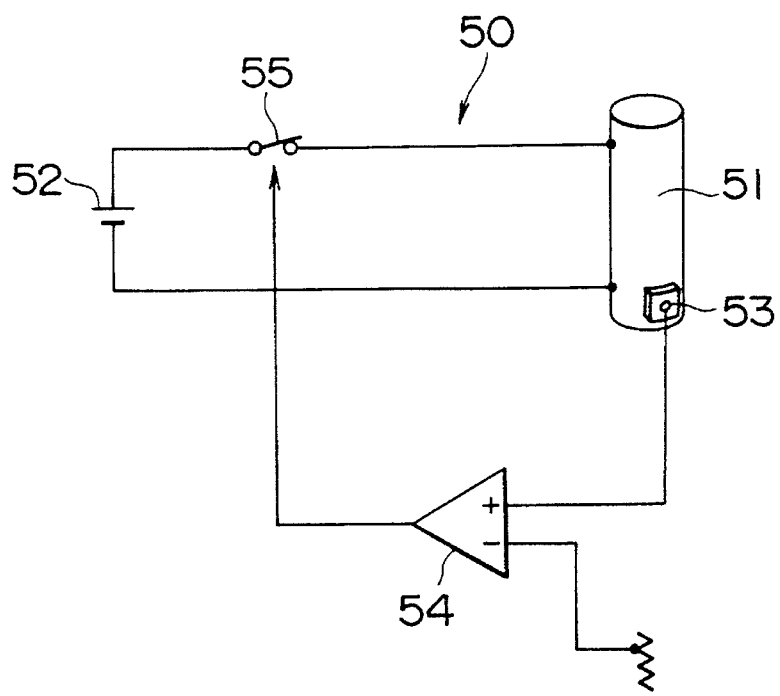
FIG. 12 is a circuit diagram of a conventional high frequency induction heating temperature control apparatus.

According to the high frequency induction heating temperature control apparatus 12 described above, the resonance circuit 4 can be always set to the resonance state and the catalytic converter 9 can be induction-heated accurately to the desired temperature for a parameter of the resonance frequency $f_o$ varied with increase of the heating temperature of the catalytic converter 9. That is, since the temperature T of the catalytic converter 9 has one-to-one correspondence to the resonance frequency $f_o$ as shown in FIG. 11, the heating temperature of the catalytic converter 9 can be set to the desired temperature by previously inputting the numerical value of the resonance frequency $f_o$ to the frequency setting device 25. Accordingly, it can be prevented exactly that the catalytic converter 9 is heated to the set temperature or is overheated to a temperature higher than the set temperature.

In the embodiment, the object to be heated is the catalytic converter 9, which is a spirally wound body as described above. Accordingly, when the catalytic converter is induction-heated, a large difference in temperature between the outer periphery and the inner periphery thereof occurs. Accordingly, how the heating temperature of the catalytic converter 9 is determined comes into question. Accordingly, for example, the relation of the heating temperature and the resonance frequency may be previously obtained on condition that a temperature of the outer peripheral portion having about 75% of the whole sectional area perpendicular to an axial line of the catalytic converter 9 exceeds a desired heating temperature.

The foregoing description has been made to the embodiment of the present invention, while the present invention is not limited to the embodiment and various changes and modifications can be made on the basis of the technical idea of the present invention. For example, the detection means and the detection location of the flag signal, the heating cutting off means based on the flag signal and the like can be changed properly if necessary. Further, it is needless to say that the heating temperature control method and the high frequency induction heating temperature control apparatus of the present invention can be applied to not only the catalytic converter 9 but also various objects to be induction heated.

As described above, according to the present invention, since the resonance circuit having the high frequency induction heating coil is set to the resonance state and the heating temperature of the object to be heated is controlled on the basis of the resonance frequency varied with increased temperature of the object under the resonance state, the object can be heated to a desired temperature accurately and rapidly without using a thermocouple sensor and a timer. In other words, since the heating temperature of the object to be heated is detected for a parameter of the resonance frequency upon the induction heating, the object can be induction-heated with high accuracy and the heating temperature can be detected extremely rapidly as compared with the case where a thermocouple sensor is used, to thereby reduce a necessary time for heating.

Further, the conventional method using a timer has the possibility that the object is not heated to a predetermined temperature due to scattering of a dimension of the object (deformation in shape and eccentricity) existing in no small quantities and deterioration in material quantity caused by secular change even if a predetermined electric power is supplied, although according to the present invention since the resonance frequency is utilized as the detection means of the heating temperature, the object can be always induction heated to a desired temperature without influence of secular change for individual objects and is very practical.

We claim:

1. A high frequency induction method with temperature control using a high frequency induction coil and a high frequency power source directly connected to said coil via a condenser for supplying an alternating current with high frequency, comprising the steps of:

(a) starting high frequency induction for heating a workpiece by supplying high frequency electricity, from said high frequency power source, to a series resonance circuit including said high frequency induction coil for heating said workpiece by high frequency induction heating, and said condenser;

(b) unifying the phases of a high frequency voltage and current output respectively from said high frequency power source, thereby maintaining said resonance circuit in a resonance state at a resonance frequency corresponding to the temperature of said workpiece; and (c) controlling the temperature of said workpiece on the basis of a resonance frequency, said resonance frequency varying with the increase in the temperature of said workpiece in said resonance state.

2. A heating temperature control method in high frequency induction heating, according to claim 1, wherein said workpiece is a catalytic converter for purifying exhaust gas of an automobile.

3. A high frequency induction heating temperature control apparatus comprising:

(a) a high frequency power supply unit;

(b) a resonance circuit including a series circuit of a high frequency induction heating coil for high frequency induction heating an object to be heated and a condenser to be supplied with high frequency electric power from said high frequency power supply unit;

(c) a phase control circuit for controlling the power supply frequency of said high frequency power supply unit so that a phase of a high frequency voltage produced by said high frequency power supply unit is substantially coincident with a phase of a high frequency current flowing through said high frequency induction heating coil to always set said resonance circuit to a resonance state; and (d) a flag signal generating circuit for detecting that the power supply frequency of said high frequency power supply unit reaches a predetermined frequency to generate a predetermined flag signal;

whereby said object is high frequency induction heated continuously while said resonance circuit is always set to the resonance state by said control circuit in response to variation of an impedance of said high frequency induction heating coil due to increased temperature of said object and the supply of electric power to said resonance circuit from said high frequency power supply is cut off on the basis of said flag signal generated by said flag signal generating circuit when a resonance frequency of said resonance circuit reaches a predetermined frequency.

* * * * *